United States Patent
Haslbeck et al.

(10) Patent No.: US 10,551,273 B2
(45) Date of Patent: Feb. 4, 2020

(54) METHOD FOR DETECTING A LEAK IN A CRANKCASE BREATHER

(71) Applicant: Bayerische Motoren Werke Aktiengesellschaft, Munich (DE)

(72) Inventors: Markus Haslbeck, Freising (DE); Robert Biebl, Hunding (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 271 days.

(21) Appl. No.: 15/068,898

(22) Filed: Mar. 14, 2016

(65) Prior Publication Data

US 2016/0195449 A1   Jul. 7, 2016

Related U.S. Application Data

(63) Continuation of application No. PCT/EP2014/074306, filed on Nov. 12, 2014.

(30) Foreign Application Priority Data

Dec. 10, 2013  (DE) .................. 10 2013 225 388

(51) Int. Cl.
    *G01M 3/02*     (2006.01)
    *F01M 13/00*     (2006.01)
    *F01M 13/02*     (2006.01)

(52) U.S. Cl.
    CPC ........ *G01M 3/025* (2013.01); *F01M 13/0011* (2013.01); *F01M 2013/0083* (2013.01);
(Continued)

(58) Field of Classification Search
CPC .. F01M 13/00; F01M 13/0011; F01M 13/022; F01M 2013/0083;
(Continued)

(56) References Cited

U.S. PATENT DOCUMENTS

| | | | | |
|---|---|---|---|---|
| 5,792,949 A * | 8/1998 | Hewelt | ................. | G01M 3/025 |
| | | | | 123/41.86 |
| 6,098,603 A * | 8/2000 | Maegawa | ............ | F01M 13/023 |
| | | | | 123/198 D |

(Continued)

FOREIGN PATENT DOCUMENTS

| CN | 1549892 A | 11/2004 |
|---|---|---|
| CN | 101614144 A | 12/2009 |

(Continued)

OTHER PUBLICATIONS

Chinese-language Office Action issued in counterpart Chinese Application No. 201480053621.4 dated Jul. 25, 2017 with English translation (Eleven (11) pages).

(Continued)

*Primary Examiner* — Randy W Gibson
*Assistant Examiner* — Gedeon M Kidanu
(74) *Attorney, Agent, or Firm* — Crowell & Moring LLP

(57) ABSTRACT

A method is provided for detecting a leak in a crankcase breather of an internal combustion engine, in which a cavity of a crankcase is connected in a gas conducting manner to a fresh air section of the internal combustion engine. A pressure sensor is provided for measuring a pressure in the cavity. An electronic control unit is provided for evaluating the signals of the pressure sensor. The method includes: measuring of a gas pressure by way of the pressure sensor in the crankcase breather system at a defined rotational speed and load of the internal combustion engine, comparing an actual pressure value with a setpoint pressure value, detecting a leak if the setpoint pressure value is exceeded. As a result of the method, an air flow meter can be dispensed with and a satisfactory separation effect is produced between a satisfactory system and a defective system.

16 Claims, 1 Drawing Sheet

(52) U.S. Cl.
CPC ............... *F01M 2013/0088* (2013.01); *F01M 2013/0094* (2013.01)

(58) Field of Classification Search
CPC ... F01M 2013/0088; F01M 2013/0094; F01M 2250/60; G01M 3/025; H01H 2085/208; H01H 2085/2085; H01H 85/2035; H01R 12/724; H01R 13/639; H01R 13/68
See application file for complete search history.

(56) References Cited

U.S. PATENT DOCUMENTS

| | | | |
|---|---|---|---|
| 6,240,772 | B1 | 6/2001 | Thomas |
| 6,968,831 | B2* | 11/2005 | Kim ........................ F01L 1/00 123/568.11 |
| 2001/0022175 | A1* | 9/2001 | Moren ................. F01M 13/022 123/572 |
| 2001/0047801 | A1 | 12/2001 | Baeuerle et al. |
| 2002/0096158 | A1* | 7/2002 | Murakami .......... F02D 35/0038 123/690 |
| 2004/0210379 | A1 | 10/2004 | Kirschke et al. |
| 2005/0022795 | A1 | 2/2005 | Beyer et al. |
| 2006/0032297 | A1* | 2/2006 | Nakoji ............... F02M 25/0809 73/114.39 |
| 2010/0050754 | A1 | 3/2010 | Roal et al. |
| 2010/0071658 | A1* | 3/2010 | Soejima ................ F01N 3/0842 123/406.19 |
| 2010/0071676 | A1 | 3/2010 | Arvan |
| 2011/0011380 | A1 | 1/2011 | Lagerloef et al. |
| 2011/0016957 | A1 | 1/2011 | Haladyna et al. |
| 2011/0023850 | A1* | 2/2011 | Karlovsky ............ F01M 13/00 123/573 |
| 2011/0197864 | A1* | 8/2011 | Karcher ................. F02M 25/06 123/574 |
| 2013/0199506 | A1* | 8/2013 | Fernandez ......... F01M 13/0011 123/572 |
| 2013/0228006 | A1 | 9/2013 | Kuhn et al. |
| 2013/0282255 | A1* | 10/2013 | Pursifull ............. G01F 23/0076 701/102 |
| 2014/0014080 | A1* | 1/2014 | Beshay ................ F01M 13/022 123/574 |
| 2014/0034031 | A1* | 2/2014 | Wagner ................ F01M 13/023 123/574 |
| 2015/0020785 | A1* | 1/2015 | An ........................ F01M 13/02 123/572 |

FOREIGN PATENT DOCUMENTS

| | | |
|---|---|---|
| CN | 101684764 A | 3/2010 |
| DE | 100 26 492 A1 | 11/2001 |
| DE | 103-20 054 A1 | 11/2004 |
| DE | 699 38 564 T2 | 6/2009 |
| DE | 10 2008 002 721 A1 | 12/2009 |
| DE | 10 2010 027 117 A1 | 1/2011 |
| DE | 10 2010 040 900 A1 | 3/2012 |
| FR | 2 854 662 A1 | 11/2004 |
| JP | 4-19312 A | 1/1992 |
| WO | WO 2009/116897 A1 | 9/2009 |

OTHER PUBLICATIONS

International Search Report (PCT/ISA/210) dated Feb. 11, 2015, with English translation (six (6) pages).
German Search Report issued in counterpart German Application No. 10 2013 225 388.5 dated Aug. 4, 2014, with partial English translation (seventeen (17) pages).

* cited by examiner

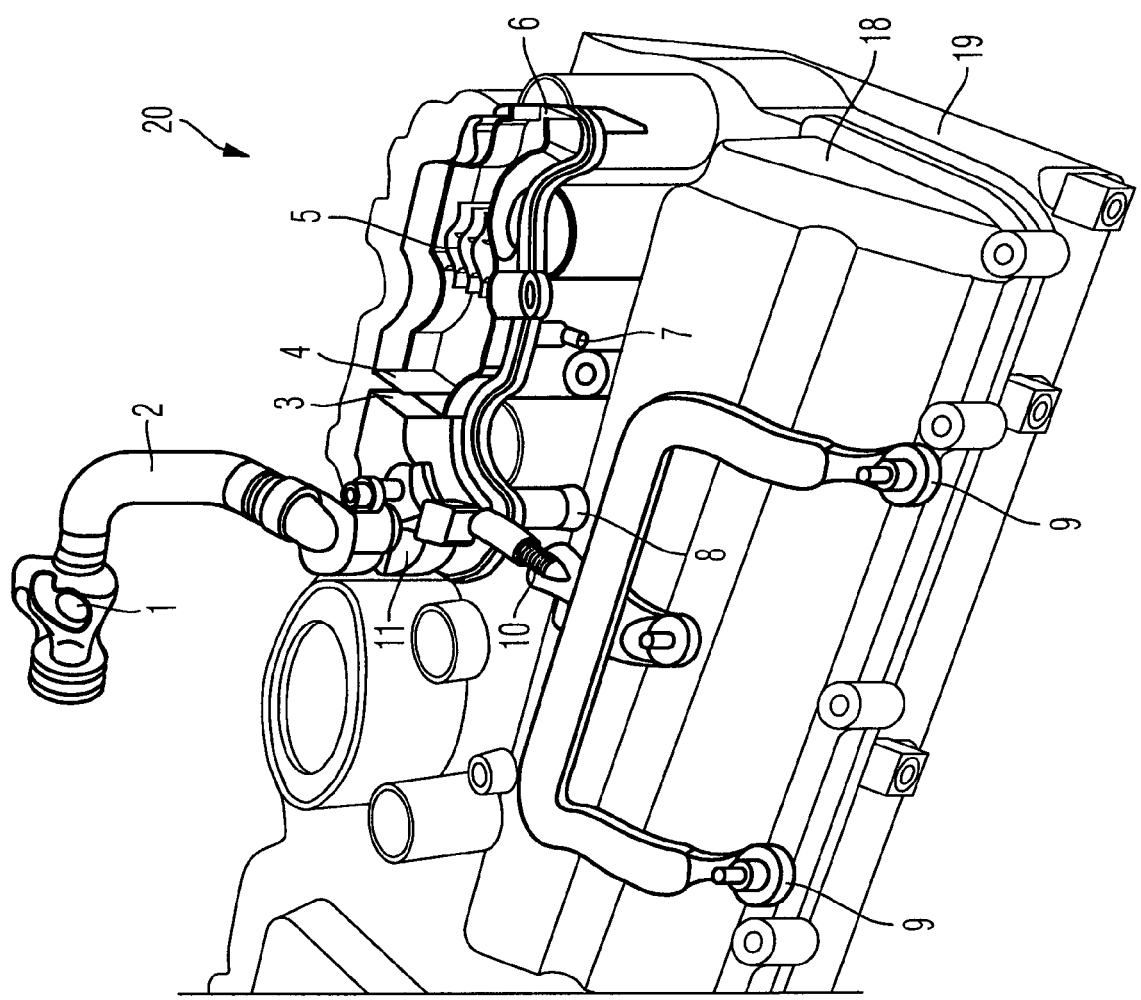

METHOD FOR DETECTING A LEAK IN A CRANKCASE BREATHER

CROSS REFERENCE TO RELATED APPLICATIONS

This application is a continuation of PCT International Application No. PCT/EP2014/074306, filed Nov. 12, 2014, which claims priority under 35 U.S.C. § 119 from German Patent Application No. 10 2013 225 388.5, filed Dec. 10, 2013, the entire disclosures of which are herein expressly incorporated by reference.

BACKGROUND AND SUMMARY OF THE INVENTION

The invention relates to a method for detecting a leak in a crankcase breather of an internal combustion engine, in which crankcase breather a cavity of a crankcase is connected in a gas-conducting manner to a fresh air section of the internal combustion engine, and a pressure sensor is provided for measuring a pressure in the cavity or the crankcase breather or in a cylinder head of the internal combustion engine.

Crankcase gases can contain multiple hydrocarbon concentrations with respect to the exhaust gases of the internal combustion engine. Monitoring systems, such as a crankcase breather, feed these crankcase gases to the intake system of the internal combustion engine at a suitable point, as a result of which the gases are fed to the combustion. Whereas in earlier years the crankcase gases were usually let out untreated into the ambient air, nowadays the venting of the crankcase is generally legally prescribed. So that the crankcase gases which are enriched with hydrocarbons cannot pass unchecked into the ambient air, a method for detecting a leak in a crankcase breather is proposed.

With respect to the technical field of a crankcase breather, reference is made, for example, to German laid-open patent application DE 10 2008 002 721 A1. This laid-open patent application discloses a method for checking the functional capability of a crankcase breather system of an internal combustion engine for a vehicle. The method has following steps:

1) interrupting the venting line between the crankcase and the air feed system of the internal combustion engine during a checking time period;

2) determining the change in an operating parameter of the internal combustion engine during the checking time period; and 3) detecting a fault in the crankcase breather system on the basis of the determined change in the operating parameter.

This method for detecting a leak in a crankcase breather does not have any significant disadvantage but is relatively time-consuming.

German laid-open patent application DE 10 2010 027 117 A1 also discloses a method and a system for monitoring a satisfactory connection of a crankcase breather system between a valve cover and an inlet system. The method includes detecting the electrical continuity between a hose connector at one end of a hose and an inlet system connector which can be mechanically connected to the hose connector.

It is disadvantageous that the entire system is relatively costly.

Furthermore, German laid-open patent application DE 100 26 492 A1 also discloses a method for performing functional diagnostics of a breather system of a crankcase of an internal combustion engine, in which method a cyclically operated valve is arranged in a venting line. The cyclically operated valve is controlled as a function of the pressure in the crankcase, which pressure is sensed by a pressure sensor. In the case of high pressure, the cyclically operated valve is opened in order to be able to suck the crankcase vapors out via the intake manifold. The cyclically operated valve is controlled here as a function of operating requests, exhaust gas requests and/or load states. On the basis of the pressure profile it is possible to detect whether, for example, the oil level is sufficient, there is a leak in the closed breather system or the internal combustion engine has increased wear.

The indirect actuation of the cyclically operated valve by means of the pressure sensor is disadvantageous.

Furthermore, it is a legal requirement for the US market that hoses which conduct crankcase gases are non-releasable or, if they can be released, are detected by way of an OBD (on-board diagnostics) if they are not plugged in. At present, hoses which are not plugged in are usually detected by comparing different engine mass flows or by means of mixture diagnostics. In this context, the engine mass flow is measured by use of a hot-film air mass flow meter (HFM).

A disadvantage with these known systems is that the selectivity between a satisfactory system and a faulty system is not always sufficient. Furthermore, an expensive hot-film air mass flow meter is required.

The object of the present invention is to provide a method for detecting a leak in a crankcase breather which requires minimum structural expenditure.

This and other objects are achieved by a method for determining a leak in a crankcase breather of an internal combustion engine, in which crankcase breather a cavity of a crankcase is connected in a gas-conducting manner to a fresh air section of the internal combustion engine, and a pressure sensor is provided for measuring a pressure in the cavity or the crankcase breather or in a cylinder head of the internal combustion engine. An electronic control unit is provided for evaluating the signals of said pressure sensor, wherein the method includes the following acts: measuring a gas pressure with the pressure sensor in the crankcase breather system at a defined rotational speed and load of the internal combustion engine; comparing an actual pressure value with a setpoint pressure value; and detecting a leak when the setpoint pressure value is exceeded.

In the cavity in the crankcase, there is a significant underpressure with respect to the surroundings in the lower and in the very high load and rotational speed ranges. In order to detect a leak in the crankcase breather system, a comparison of the air pressure in the crankcase can be measured in these load/rotational speed ranges with a pressure sensor, which is present in any case, and compared with a limiting value which is stored, for example, in a control unit. Therefore, a crankcase breather system which is subject to a leak can easily be detected. As a result of this method according to the invention, the need for a hot-film air mass flow meter can be advantageously avoided, while at the same time very good selectivity between a satisfactory system and a defective system is obtained.

Advantageous developments of the method according to the invention are described herein.

Therefore, according to a preferred embodiment a leak is preferably detected if the actual pressure value is at least 10% above the setpoint pressure value.

The setpoint pressure value is to be particularly preferably read out from a characteristic diagram which is stored in a control unit.

During the detection of a leak, the rotational speed of the internal combustion engine during the pressure measurement is preferably between 500 l/min and 5000 l/min, and in particular between 500 l/min and 3000 l/min.

Furthermore, a load of the internal combustion engine during the pressure measurement is preferably between 10% and 100%, and in particular between 20% and 40% of a maximum load, if the internal combustion engine does not have a supercharger device such as, for example, an exhaust gas turbocharger.

A load of the internal combustion engine during the pressure measurement is also preferably between 10% and 150%, and in particular between 20% and 80% of a maximum load, if the internal combustion engine has a supercharger device such as, for example, an exhaust gas turbocharger and/or a compressor.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a plan view of a crankcase breather which is illustrated in a three-dimensional manner.

DETAILED DESCRIPTION OF THE DRAWING

FIG. 1 shows a plan view of a crankcase breather 20 which is illustrated in a three-dimensional manner and is arranged above a cylinder head cover 18 which is illustrated in a semitransparent manner, and a cylinder head 19 which is illustrated in a semitransparent manner.

A crankcase breather system is composed of the crankcase breather 20 in conjunction with a crankcase, a cylinder head 19 with a cylinder head cover 18 and all the cavities which are connected thereto in a gas-conducting manner. The crankcase breather 20 serves, as mentioned above, to conduct away crankcase gases from the crankcase and to feed said gases to the combustion, in order to reduce the emissions of the internal combustion engine.

In this exemplary embodiment, the crankcase breather 20 is arranged in a cavity between the cylinder head cover 18 and the cylinder head 19. The crankcase breather 20 is composed essentially of a crankcase venting line 2 which can be connected in a gas-conducting manner to a clean air pipe (not illustrated) of the internal combustion engine via a non-return valve 1, in order to feed the crankcase gases to the combustion. Furthermore, the crankcase breather 20 illustrated here has an impact wall 3 for the precipitation of small particles of oil, a fine precipitation plate 4 for the precipitation of oil particles, a pre-separator 5 for the precipitation of relatively large oil particles, an input for the blow-by gases 6, an oil return line 7, an oil return line with a non-return valve 8, two connecting lines 9 to the inlet duct, a volume-regulating valve for an intake system with a throttle function 10 and a further oil separator 11.

The detailed method of functioning of the exemplary crankcase breather 20 and the individual components thereof will not be presented within the scope of this application, since they are generally known to a person skilled in the art and can vary greatly from one internal combustion engine to another. However, the crankcase breather 20 which is illustrated here is provided both for an induction operating mode as well as for a supercharged operating mode of the internal combustion engine, for example with an exhaust gas turbocharger.

In the induction operating mode, an underpressure is present in the intake system (not illustrated). As a result, the volume-regulating valve 10 is opened, and the blow-by gases which are purified in the separators 3, 4, 5 pass through bore holes in the cylinder head 19 to the inlet ducts and therefore into the intake system. Since there is the risk at high underpressures that oil will be sucked in via the crankcase breather 20, the pressure-regulating valve has a throttle function and limits the through flow and therefore also the pressure level in the crankcase. The underpressure in the crankcase breather 20 keeps the non-return valve 8 closed. Additionally, fresh air flows into the oil separator via a leak bore hole (not illustrated) which is located above the non-return valve 8. As a result, the underpressure in the crankcase breather 20 is limited to at maximum 100 mbar.

In the supercharged operating mode, the pressure in the intake system rises, and as a result the volume-regulating valve 10 closes. Since an underpressure is present in the clean air pipe in this operating state, the non-return valve 1 opens as a result to the clean air pipe and the purified blow-by gases are fed into the intake system via the compressing means (for example of a turbocharger or of a compressor) and a charge air cooler which is usually present.

More precise details of the method of functioning of the crankcase breather system can be obtained, for example, from the BMW training documents relating to the BMW V8 engine with the internal designation S63 Top.

A pressure sensor and an electronic control unit which are required for the method according to the invention are not illustrated in FIG. 1.

The method according to the invention for detecting a leak in the crankcase breather 20 of an internal combustion engine with the illustrated crankcase breather 20 in conjunction with the pressure sensor, the crankcase 19, the cylinder head 18 and the fresh air section of the internal combustion engine can be illustrated with the following method steps, wherein an electronic control unit (not illustrated) is provided for evaluating the signals of the pressure sensor:

1) measuring a gas pressure with the pressure sensor in the crankcase breather system at a defined rotational speed and load of the internal combustion engine, 2) comparing an actual pressure value with a setpoint pressure value, and 3) detecting a leak when the setpoint pressure value is exceeded.

A leak is preferably to be detected if the actual pressure value is at least 10% above the setpoint pressure value.

In one preferred embodiment variant, the setpoint pressure values are stored in a control unit and can be read out from a characteristic diagram which is stored in the control unit.

For particularly good detectability of a leak, the internal combustion engine is preferably operated during the pressure measurement at a rotational speed between 500 l/min and 5000 l/min, and in particular between 500 l/min and 3000 l/min.

For this purpose, the internal combustion engine is preferably operated during the pressure measurement at a load between 10% and 100%, and in particular between 20% and 40% of a maximum load, if the internal combustion engine does not have a supercharger device.

Furthermore, the internal combustion engine is operated during the pressure measurement at a load between 10% and 150%, and in particular between 20% and 80% of a maximum load, if the internal combustion engine has a supercharger device such as, for example, an exhaust gas turbocharger or a compressor.

By virtue of the method according to the invention, the need for a hot-film air mass flow meter (HFM) which is known from the prior art can be avoided. Furthermore, very good selectivity between a satisfactory system and a defective system is obtained. A defective system is understood, for example, if the crankcase venting line 2 is not present, the crankcase venting line 2 is ruptured or if the crankcase venting line 2 has been incorrectly mounted.

LIST OF REFERENCE NUMBERS

1. Non-return valve
2. Crankcase venting line
3. Impact wall
4. Fine precipitation plate
5. Pre-separator
6. Input blow-by gases
7. Oil return line
8. Oil return line with non-return valve
9. Connecting line to the inlet duct
10. Volume-regulating valve for the intake system with throttle function
11. Oil separator
18. Cylinder head cover
19. Cylinder head
20. Crankcase breather The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for detecting a leak in a crankcase breather of an internal combustion engine, in which crankcase breather a cavity of a crankcase, in an induction mode, passes purified blow-by gases, from which oil particles have been precipitated out, through a cylinder head of the internal combustion engine to a fresh air section of the internal combustion engine and, in a supercharged operating mode, passes the purified blow-by gases through a turbocharger or compressor to the fresh air section of the internal combustion engine, and a pressure sensor is provided for measuring a pressure in the cavity or the crankcase breather or in the cylinder head of the internal combustion engine, wherein an electronic control unit is provided for evaluating the signals of said pressure sensor, the method comprising the acts of:
opening a volume-regulating valve of the crankcase breather in the induction mode to pass the purified blow-by gases through the cylinder head when an underpressure is present in an intake system of the internal combustion engine,
closing the volume-regulating valve when an actual gas pressure in the intake system rises in the supercharged operating mode to feed the purified blow-by gases into the intake system via the turbocharger or compressor,
measuring the actual gas pressure with the pressure sensor in the crankcase breather at a defined rotational speed and load of the internal combustion engine,
reading a setpoint pressure value out from the electronic control unit and comparing an actual pressure value, obtained by measuring the actual gas pressure, with the setpoint pressure value, and
detecting a leak with the electronic control unit when the electronic control unit determines that the setpoint pressure value is exceeded by the actual gas pressure value.

2. The method according to claim 1, further comprising the act of:
reading out the setpoint pressure value from a characteristic diagram stored in the control unit.

3. The method according to claim 1, further comprising the act of:
operating the internal combustion engine during the pressure measurement at a rotational speed between 500 l/min and 5000 l/min.

4. The method according to claim 1, further comprising the act of:
operating the internal combustion engine during the pressure measurement at a rotational speed between 500 l/min and 3000 l/min.

5. The method according to claim 1, further comprising the act of:
operating the internal combustion engine during the pressure measurement at a load between 10% and 100% of a maximum load when the internal combustion engine is not in the supercharged operating mode.

6. The method according to claim 1, further comprising the act of:
operating the internal combustion engine during the pressure measurement at a load between 20% and 40% of a maximum load when the internal combustion engine is not in the supercharged operating mode.

7. The method according to claim 1, further comprising the act of:
operating the internal combustion engine during the pressure measurement at a load between 10% and 150% of a maximum load when the internal combustion engine is in the supercharged operating mode.

8. The method according to claim 1, further comprising the act of:
operating the internal combustion engine during the pressure measurement at a load between 20% and 80% of a maximum load when the internal combustion engine is in the supercharged operating mode.

9. The method according to claim 1, further comprising the act of:
detecting presence of a leak when the actual pressure value is at least 10% above the setpoint pressure value.

10. The method according to claim 9, further comprising the act of:
reading out the setpoint pressure value from a characteristic diagram stored in the control unit.

11. The method according to claim 10, further comprising the act of:
operating the internal combustion engine during the pressure measurement at a rotational speed between 500 l/min and 5000 l/min.

12. The method according to claim 11, further comprising the act of:
operating the internal combustion engine during the pressure measurement at a rotational speed between 500 l/min and 3000 l/min.

13. The method according to claim 11, further comprising the act of:
operating the internal combustion engine during the pressure measurement at a load between 10% and 100% of a maximum load when the internal combustion engine is not in the supercharged operating mode.

14. The method according to claim 11, further comprising the act of:
   operating the internal combustion engine during the pressure measurement at a load between 20% and 40% of a maximum load when the internal combustion engine is not in the supercharged operating mode.

15. The method according to claim 11, further comprising the act of:
   operating the internal combustion engine during the pressure measurement at a load between 10% and 150% of a maximum load when the internal combustion engine is in the supercharged operating mode.

16. The method according to claim 11, further comprising the act of:
   operating the internal combustion engine during the pressure measurement at a load between 20% and 80% of a maximum load when the internal combustion engine is in the supercharged operating mode.

\* \* \* \* \*